(12) United States Patent
Khalid

(10) Patent No.: US 8,572,947 B2
(45) Date of Patent: Nov. 5, 2013

(54) GAS TURBINE ENGINE WITH EJECTOR

(75) Inventor: Syed Jalaluddin Khalid, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 253 days.

(21) Appl. No.: 12/604,759

(22) Filed: Oct. 23, 2009

(65) Prior Publication Data

US 2010/0162679 A1 Jul. 1, 2010

Related U.S. Application Data

(60) Provisional application No. 61/204,004, filed on Dec. 31, 2008.

(51) Int. Cl.
*F02K 3/02* (2006.01)
(52) U.S. Cl.
USPC .................................. 60/226.1; 60/262
(58) Field of Classification Search
USPC ............ 60/226.1, 226.3, 266, 770, 785, 228, 60/795, 262; 244/130, 200, 204, 206–208, 244/211–213; 239/265.17, 265.23, 265.33
See application file for complete search history.

(56) References Cited

U.S. PATENT DOCUMENTS

| 2,972,860 | A | | 2/1961 | Moy | |
|---|---|---|---|---|---|
| 3,317,162 | A | * | 5/1967 | Grant | 244/209 |
| 3,409,228 | A | * | 11/1968 | Mehr | 239/127.3 |
| 3,432,100 | A | | 3/1969 | Hardy et al. | |
| 3,572,960 | A | | 3/1971 | McBride | |
| 3,591,085 | A | | 7/1971 | Medawar et al. | |
| 3,591,087 | A | | 7/1971 | Tontini | |
| 3,710,890 | A | | 1/1973 | True et al. | |
| 4,018,046 | A | | 4/1977 | Hurley | |
| 4,043,121 | A | * | 8/1977 | Thomas et al. | 60/204 |
| 4,052,847 | A | * | 10/1977 | Rodgers et al. | 60/262 |
| 4,193,262 | A | | 3/1980 | Snell | |
| 4,295,332 | A | | 10/1981 | Steyer et al. | |
| 4,466,587 | A | | 8/1984 | Dusa et al. | |
| 4,493,184 | A | | 1/1985 | Nikkanen et al. | |
| 5,136,837 | A | | 8/1992 | Davison | |
| 5,137,230 | A | * | 8/1992 | Coffinberry | 244/118.5 |
| 5,284,012 | A | | 2/1994 | Laborie et al. | |
| 5,435,127 | A | | 7/1995 | Luffy et al. | |
| 5,586,431 | A | * | 12/1996 | Thonebe et al. | 60/226.1 |
| 5,746,047 | A | | 5/1998 | Steyer et al. | |

(Continued)

OTHER PUBLICATIONS

International Search Report and Written Opinion, Jan. 5, 2012, PCT/2011/045345.

*Primary Examiner* — Phutthiwat Wongwian
(74) *Attorney, Agent, or Firm* — Krieg DeVault, LLP

(57) ABSTRACT

The present inventions include a boundary layer ejector fluidically connecting boundary layer bleed slots from an external surface of an aircraft to reduce aircraft/nacelle/pylon drag, reduce jet noise and decrease thrust specific fuel consumption. In one embodiment a boundary layer withdrawn through the boundary layer bleed slots is entrained with an exhaust flow of a gas turbine engine. In another embodiment a boundary layer withdrawn through the boundary layer bleed slots is entrained with a flow stream internal to the gas turbine engine, such as a fan stream of a turbofan. Members can be provided near an outlet of a passageway conveying the withdrawn boundary layer air to locally reduce the pressure of the fluid in which the withdrawn boundary layer air is to be entrained. A lobed mixer can be used in some embodiments to effect mixing between the boundary layer and a primary fluid of the ejector.

8 Claims, 5 Drawing Sheets

(56) References Cited

U.S. PATENT DOCUMENTS

| | | |
|---|---|---|
| 5,782,077 A | 7/1998 | Porte |
| 5,884,873 A | 3/1999 | Breit |
| 5,941,065 A | 8/1999 | Lidstone et al. |
| 6,094,907 A | 8/2000 | Blackner |
| 6,216,982 B1 | 4/2001 | Pfennig et al. |
| 6,295,805 B1 | 10/2001 | Lackey et al. |
| 6,301,877 B1 | 10/2001 | Liang et al. |
| 6,983,602 B2 | 1/2006 | Senile |
| 6,988,674 B2 | 1/2006 | Steyer et al. |
| 7,048,230 B2 | 5/2006 | Meyer |
| 7,200,999 B2 | 4/2007 | Bagnall et al. |
| 7,364,117 B2 | 4/2008 | Dionne |
| 7,424,805 B2 | 9/2008 | Johnson |
| 7,607,305 B2 | 10/2009 | Steyer et al. |
| 7,607,306 B2 | 10/2009 | Steyer et al. |
| 7,770,381 B2 * | 8/2010 | Johnson et al. .......... 60/263 |
| 2002/0092948 A1 | 7/2002 | Dugan |
| 2004/0089764 A1 | 5/2004 | McClure |
| 2005/0081530 A1 | 4/2005 | Bagnall et al. |
| 2005/0151026 A1 | 7/2005 | Meyer |
| 2007/0245711 A1 | 10/2007 | Stretton |
| 2008/0014078 A1 | 1/2008 | Suciu et al. |
| 2008/0296439 A1 | 12/2008 | Cloft et al. |
| 2009/0155046 A1 | 6/2009 | Haas |
| 2009/0165995 A1 | 7/2009 | Bajusz et al. |
| 2009/0217643 A1 | 9/2009 | Sokhey et al. |
| 2009/0314004 A1 | 12/2009 | Van Der Woude |
| 2010/0162679 A1 | 7/2010 | Khalid |

* cited by examiner

GAS TURBINE ENGINE WITH EJECTOR

CROSS REFERENCE TO RELATED APPLICATIONS

The present application claims the benefit of U.S. Provisional Patent Application 61/204,004, filed Dec. 31, 2008, and is incorporated herein by reference.

FIELD OF THE INVENTION

The present invention generally relates to gas turbine engines useful in removing a boundary layer of air, and more particularly, but not exclusively, to integrated aircraft engine with an ejector having fluid supplied by boundary layer bleed flow.

BACKGROUND

Challenges remain in providing aircraft propulsion systems capable of producing high thrust, emitting low jet noise, minimizing installation drag, minimizing fuel consumption, and ensuring fuel and lubrication temperatures are within specification requirements, among potential other challenges. The present inventions address problems associated with existing propulsion systems by providing a novel and non-obvious contributions relating thereto.

SUMMARY

One embodiment of the present invention is a unique gas turbine engine ejector for removing a boundary layer from a flow surface. Other embodiments include apparatuses, systems, devices, hardware, methods, and combinations for removing a boundary layer through an ejector action. Further embodiments, forms, features, aspects, benefits, and advantages of the present application shall become apparent from the description and figures provided herewith.

The present inventions include a boundary layer ejector fluidically connecting boundary layer bleed slots from an external surface of an aircraft/nacelle/pylon to reduce aircraft drag, reduce jet noise and decrease thrust specific fuel consumption.

BRIEF DESCRIPTION OF THE DRAWINGS

The description herein makes reference to the accompanying drawings wherein like reference numerals refer to like parts throughout the several views, and wherein.

DETAILED DESCRIPTION OF THE ILLUSTRATIVE EMBODIMENTS

Figure 1:
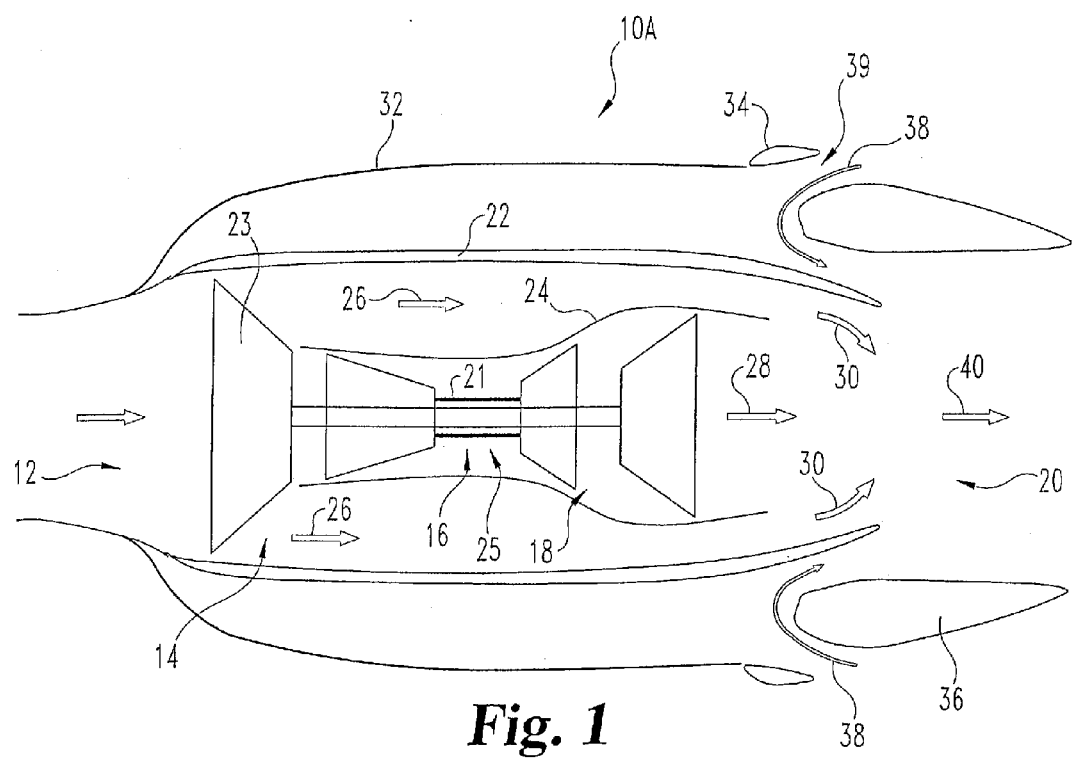
FIG. 1 is a schematic cross-sectional view of a prior art gas turbine engine with a nozzle ejector.

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

One aspect of the present invention relates to a propulsion nozzle ejector utilizing boundary layer bleed to supply airflow to an ejector passageway. The disclosed ejector is operable to increase take-off thrust, reduce in-flight thrust specific fuel consumption, reduce installation and aircraft drag, reduce in-flight jet noise through a decrease in exhaust velocity, and provide a source of relatively low temperature airflow for thermal management of aircraft systems.

Boundary layer fluid flow is defined by the fluid in a layer adjacent to a body within which the major effects of viscosity are concentrated. In simplistic terms viscosity can be thought of as the thickness of the low velocity fluid or the resistance of the fluid to flow along a pathway. Viscous fluids create a boundary layer adjacent a body wherein the velocity of the fluid is approximately zero at the surface of the body and increases proportionally until it reaches the bulk fluid velocity outside of the boundary layer. The boundary layer produces losses due to aerodynamic drag on the aircraft. The boundary layer can be thought of as a dead zone wherein minimal useful fluid work can be done. The present invention advantageously removes at least a portion of boundary layer fluid and converts the boundary layer fluid into a useful means of increasing system efficiency and providing a source of thermal management.

Referring to FIG. 1, a prior art gas turbine engine 10A is illustrated. Components of the prior art engine 10A that are similar to the inventive engine 10B in FIG. 2, will have the same numerical description. The gas turbine engine 10A, as well as the inventive engine 10B, can take a variety of forms and in application can be used to provide power to an aircraft. In some embodiments the gas turbine engine 10A and/or 10B can be an adaptive cycle engine or a variable cycle engine. In other embodiments the gas turbine engine 10A and/or 10B can have any number of spools, including just one. In still further embodiments the gas turbine engine 10A and/or 10B can be a turbojet, turboprop, turbofan, or a turboshaft engine.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

The gas turbine engine 10A of the illustrative embodiment includes an inlet section 12, a compression section 14, a combustion section 16, an expansion or turbine section 18, and an exhaust section 20. In operation, air is drawn in through the inlet 12 and compressed to a high pressure relative to ambient pressure in the compression section 14. The air is mixed with fuel in the combustion section 16 wherein the fuel/air mixture burns and produces a high temperature and pressure working fluid from which the turbine section 18 extracts power. The turbine section 18 is mechanically coupled to the compression section 14 via a shaft 21. The shaft 21 rotates about a centerline axis that extends axially along the longitudinal axis of the engine 10A, such that as the turbine section 18 rotates due to the forces generated by the high pressure working fluid the compression section 14 is rotatingly driven by the turbine section 18 to produce compressed air.

The compression section 14 can optionally include a low-pressure fan 23 which produces a bypass flow stream represented by arrow 26. The bypass flow stream 26 flows between an outer case 22 and an inner faring 24 that encompasses the core 25 of the engine 10A. The core 25 produces a core exhaust flow represented by arrow 28. Mixed engine exhaust flow represented by arrows 30 is the combined mass flow of the bypass flow 26 and the core flow 28.

A nacelle 32 encompasses the outer case 22 of the engine 10A. A variable flap 34 is positioned adjacent the aft end of the nacelle 32. In other embodiments, however, the variable flap 34 can be located at positions other than adjacent the aft end of the nacelle 32. A nozzle 36 is positioned further aft of the variable flap 34 in the illustrative embodiment. When the variable flap 34 is in an open position a nozzle ejector flow 38 can be entrained through a passageway 39 formed between the variable flap 34 and the nozzle 36. In some embodiments, however, the passageway 39 can be formed between the variable flap 34 and a structure or structures other than the nozzle 36. A total exhaust flow represented by arrow 40 includes the mixed engine exhaust flow 30 and the nozzle ejector flow 38.

Figure 2:
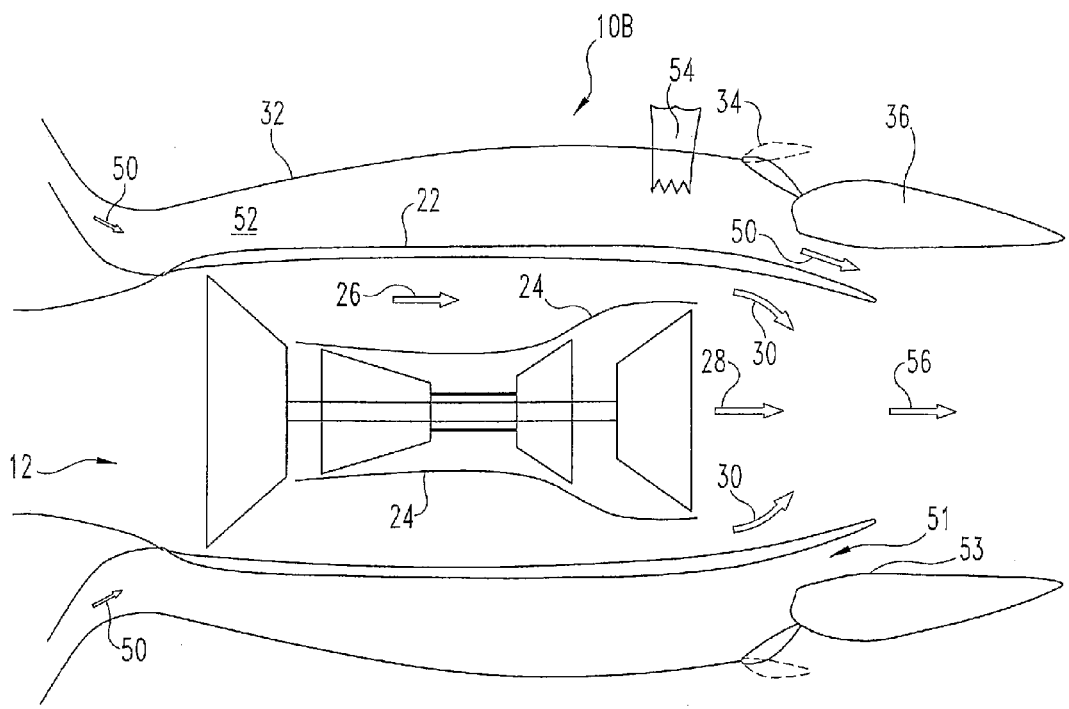
FIG. 2 is a schematic cross-sectional view of a gas turbine engine with a boundary layer ejector according to the present application.

Referring to FIG. 2, a gas turbine engine 10B is illustrated having novel features relative to the gas turbine engine 10A. The gas turbine engine 10B includes boundary layer bleed flow represented by arrow 50. The boundary layer bleed flow 50 can be transported through bleed ports (not shown in FIG. 2 but described and shown further below) from any surface of the engine 10B or aircraft (also not shown in FIG. 2 but described and shown further below) and directed through a nacelle passageway 52. The bleed ports can take any variety of forms including slots or holes, among potential others. As a matter of convenience of description, therefore, the term "bleed port" can refer to any of these types of configurations. The surface from which the boundary layer bleed flow 50 originates from can be any surface which is exposed to a moving fluid. Such surfaces include the outside portion of a nacelle exposed to the free stream, the inside surface forming part of the passageway through which the bypass flow stream passes, among potential other surfaces.

In some embodiments one or more heat exchangers 54 can be disposed within the passageway 52 to remove heat from system components (not shown). The one or more heat exchangers 54 can take a variety of forms and, in those applications in which multiple heat exchanges 54 are used, not all need be the same. The temperature of the boundary layer bleed flow 50 can be approximately the same as the ambient temperature, therefore at altitude the boundary layer bleed flow 50 can provide a large heatsink. In those embodiments having one or more heat exchangers, after the boundary layer bleed flow 50 passes the heat exchanger 54, the flow can be accelerated through a channel 51 between the nozzle 36 and the outer case 22. Whether or not heat exchangers are present, however, it will be understood that the channel 51 can be of an orientation to permit the flow to be accelerated. For example, the channel 51 can have a smaller cross sectional area relative to the passageway 52 at locations upstream of the channel 51.

In some applications a channel member 53 can be used to selectively vary the cross sectional area of the channel 51, and in particular can be used to change the exit area of the passageway 52. The channel member 53 can be actuated at a variety of rates which can depend on properties of a total exhaust flow 56 which is the boundary layer bleed flow 50 mixed with the bypass flow 26 and the core flow 28. Removing boundary layer flow from external surfaces reduces the drag and the additional mass flow added into the total exhaust flow 56 increases the thrust of the engine 10B.

Figure 5:
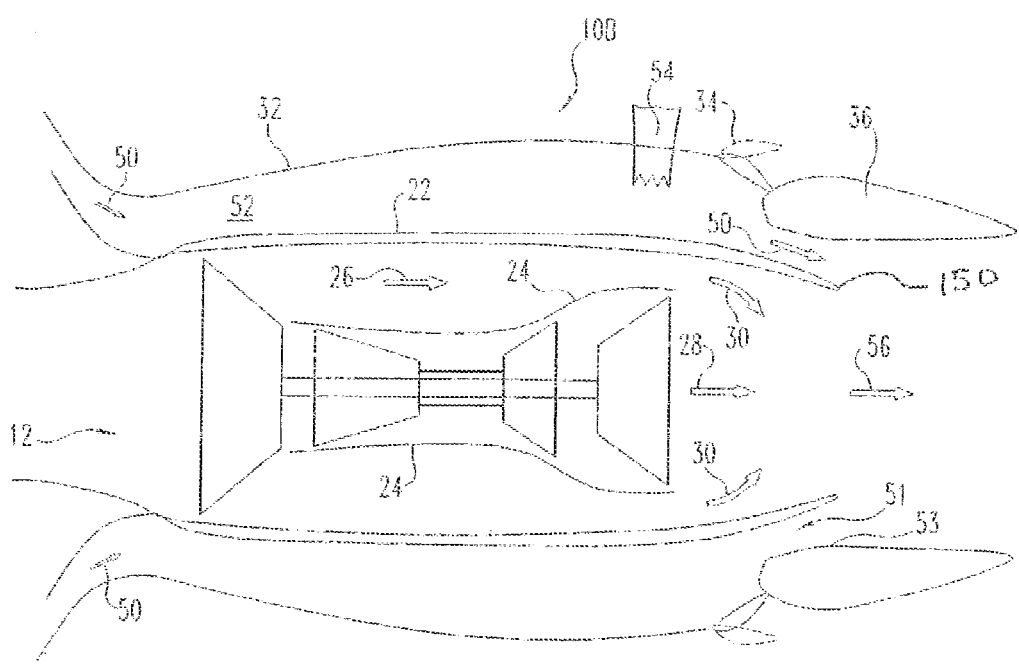
FIG. 5 is a schematic cross-sectional view of a gas turbine engine with a boundary layer ejector according to the present application.

In the takeoff and taxi mode the variable flap 34 can be opened as shown in the dashed outline which permits air to enter from the rear and go around the ejector leading edge into the exhaust stream 56, similar to that depicted in FIG. 1. The integrated static pressure around the ejector results in a thrust component while the jet noise is reduced as a result of reduced exhaust velocity. In cruise mode, the variable flap 34 can be closed as depicted by the solid outline in FIG. 2. Boundary layer bleed air 50 is then pulled from passageways connected to a surface associated with any of the nacelle, pylon, wing, or fuselage or other locations that a boundary layer can build up on. The resulting removal of the boundary layer reduces the installation/aircraft drag. The RAM effect during cruise in conjunction with ejector pumping can effectively remove the boundary layer especially since the ejector is being driven by a high velocity (normally sonic but can be supersonic) and high mass flow primary nozzle 36 which will entrain a large amount of secondary flow. Ejector pumping can be further enhanced by forming the shroud, concentric surface, or other structure that separates the primary nozzle flow from the secondary boundary layer flow as a lobed mixer configuration. (one embodiment of which is shown as reference numeral 150 in FIG. 5). Such a configuration can assist in forcing mixing between the two flows and permit shortening of the engine length.

Figure 3:
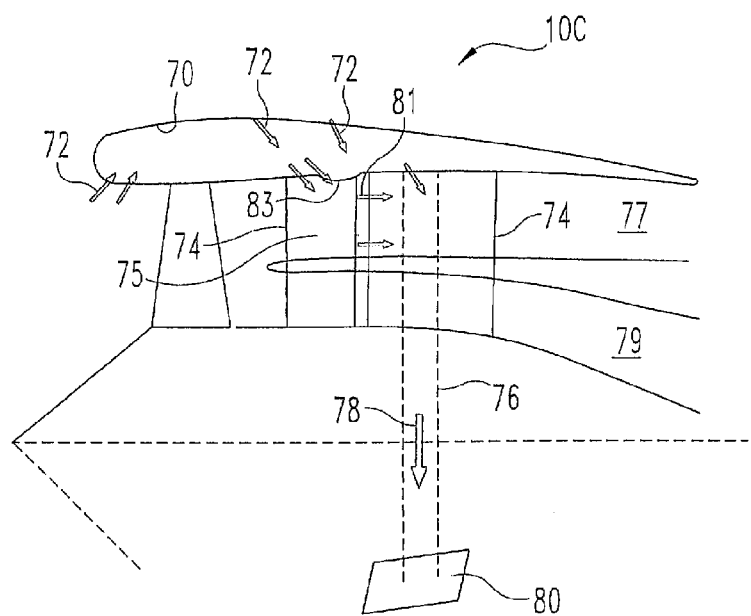
FIG. 3 is a schematic cross-sectional view of a portion of a gas turbine engine with a boundary layer ejector according an alternate embodiment of the present application.

Referring to FIG. 3, an alternate engine configuration 10C is depicted. It will be appreciated, however, that the alternate engine configuration can have a number of the variations described above with respect to the gas turbine engines 10A and/or 10B. A nacelle 70 can include boundary layer bleed ports 72 fluidically connected to a member 74 or the like extending at least partially across the flow path depicted. The member 74 can take the form of a strut, an outlet guide vane, or other type of member disposed within the flow path. The member includes a passage 75 through which a boundary layer which has been pulled through boundary layer bleed ports 72 can pass. The passage 75 can be the hollow interior of the member 74, but can also take other forms in different embodiments. In some embodiments the passage 75 can extend across the bypass flow path 77 and the core flow path 79. In some forms the member 74 can include one or more exit apertures 81 through which the boundary layer which has been pulled through boundary layer bleed ports 72 can pass after passing through the passage 75. The one or more exit apertures 81 can be formed in or near the trailing edge of the member 74. In some forms a conduit 76 can be provided in a member 74 which is operable to carry relatively cool boundary layer bleed air 78 to one or more components 80 within the engine 10C requiring cooling flow. For example the component 80 can be an electronic apparatus or a relatively hot mechanical apparatus such as a combustion or turbine component. Though the conduit 76 is depicted in a member 74 downstream of the member 74 having the exit apertures 81, it will be appreciated that the conduit 76 can be provided in the member 74 shown as having the apertures 81, but in an embodiment that otherwise lacks the apertures 81. In other words, in lieu of or in addition to the aperture 81, the member 74 can include the conduit 76. In still further embodiments the conduit 76 can lead to an ejector such as the nozzle ejector depicted in the embodiments of FIG. 2.

In some forms the alternate engine configuration 10C can be used to remove a boundary layer through boundary layer bleed ports 72 to increase inlet pressure recovery and reduce pressure distortion seen by the fan. The resulting higher pressure recovery increases thrust and lowers specific fuel consumption. The lower pressure distortion increases stall margin.

In some forms the engine 10C can include a flow path protrusion 83 that can reduce the cross sectional area of the bypass flow path 77 at that location. For example, in some forms outlet guide vanes (OGV's) are provided to eliminate circumferential swirl and can have a flow area that increases from the leading to the trailing edge. The inner and outer walls of the OGV's can be tapered to reduce the area increase thus increasing the OGV exit velocity and ejector pumping. The flow path protrusion 83 can be used to locally lower the pressure of the fluid passing through the bypass flow path 77 so that in the case of boundary layer which has been pulled through boundary layer bleed ports 72 and is discharged through the exit aperture 81 can be entrained by the flow through the bypass flow path 77. In one form the flow path protrusion 83 can be actuated and moved to a variety of positions to selectively lower or raise the local pressure and thus vary the ability of the flow through the bypass flow path 77 to entrain the boundary layer which has been pulled through boundary layer bleed ports 72.

Figure 4A:
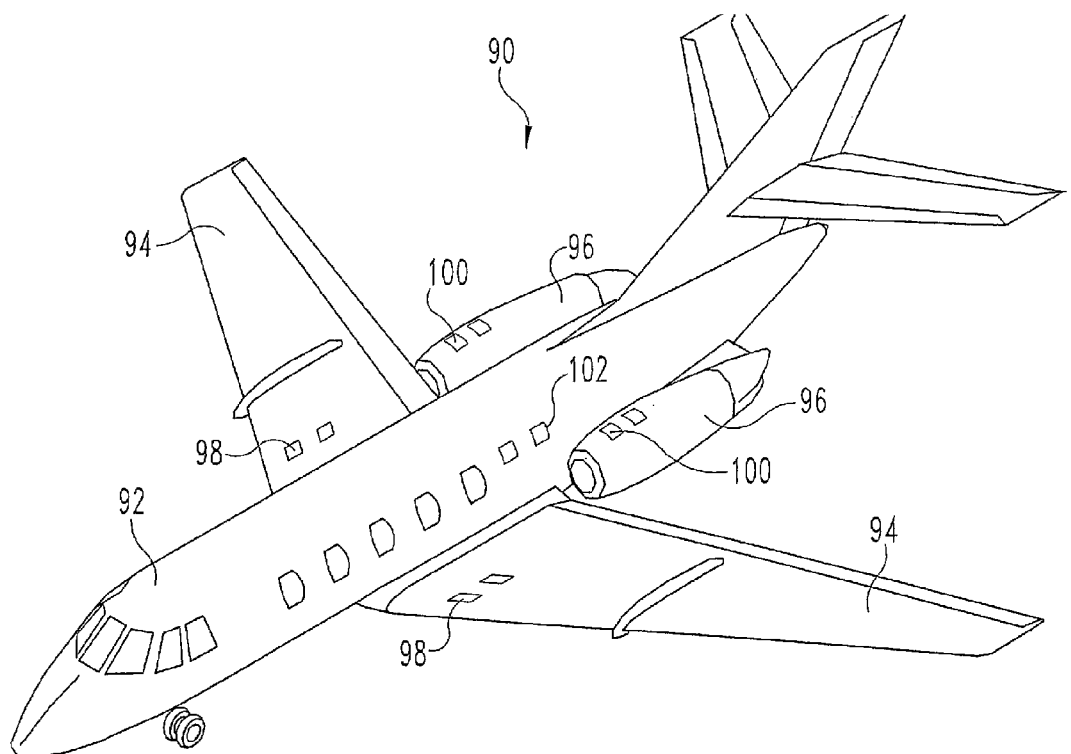
FIG. 4a is a perspective view of one form of aircraft using the boundary layer ejector of the present application.

Referring now to FIG. 4a an aircraft 90 is depicted having a fuselage 92 with wings 94 extending therefrom and gas turbine engines 96 mounted thereon. The wings 94 can include a plurality of bleed slots 98 for removing boundary layer flow from the wings 94 and delivering said flow to the ejector nozzle or other components disposed on the aircraft 90, such as through any of the various embodiments discussed herein. In addition to or alternatively, nacelle bleed slots 100 and fuselage bleed slots 102 can be utilized for removing boundary layer flow. Referring briefly to FIG. 4d, in some aircraft configurations the Mach number in the passage located between the nacelle 146 and the fuselage 148 could increase because of the blockage created by the boundary layer thus resulting in increased installation drag. Removal of this boundary layer through one or more of the bleed slots 144 depicted in FIG. 4d can result in decreased drag. The bleed slots 144 can be located on either or both of the fuselage 148 or nacelle 146.

Figure 4B:
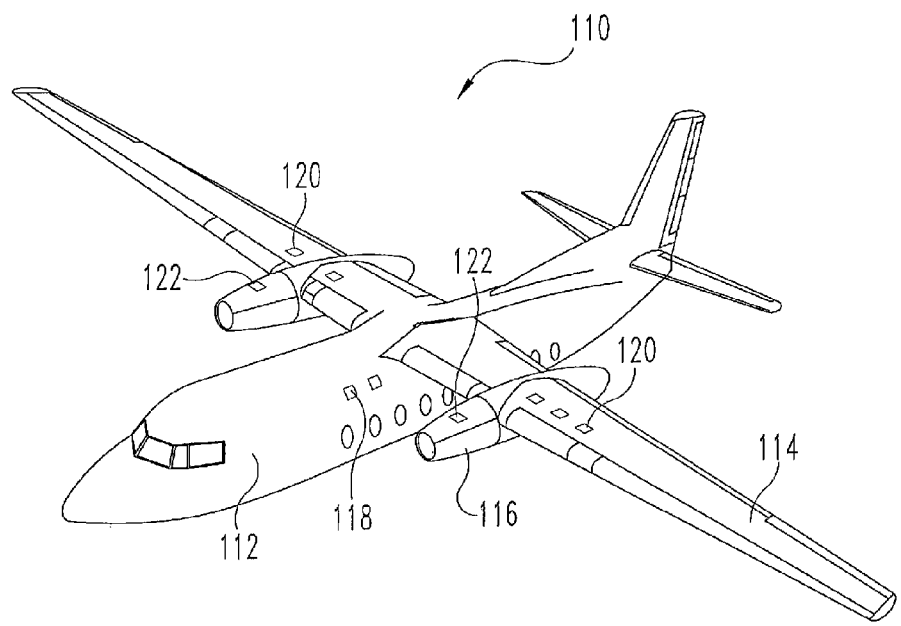
FIG. 4b is a perspective view of another form of aircraft using the boundary layer ejector of the present application.

Referring to FIG. 4b, an alternate aircraft configuration 110 is depicted with wing 114 mounted engines 116. Similar to the aircraft of FIG. 4a the fuselage 112, the wings 114, and the engines 116 can all include boundary layer bleed slots 118, 120 and 122 respectively.

Figure 4C:
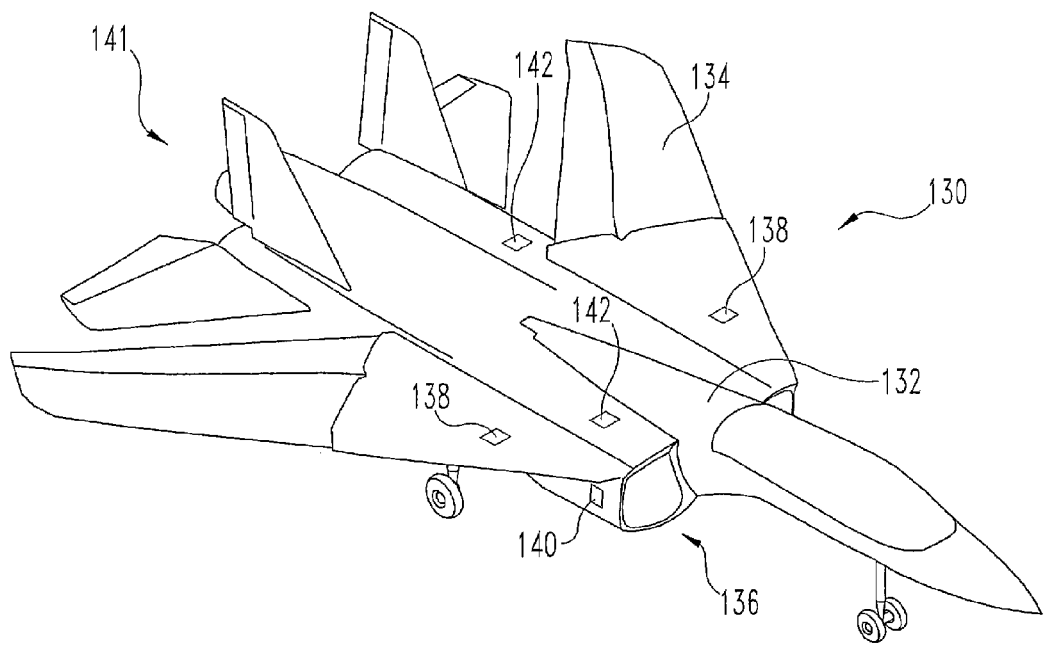
FIG. 4c is a perspective view of yet another form of aircraft using the boundary layer ejector of the present application.
Figure 4D:
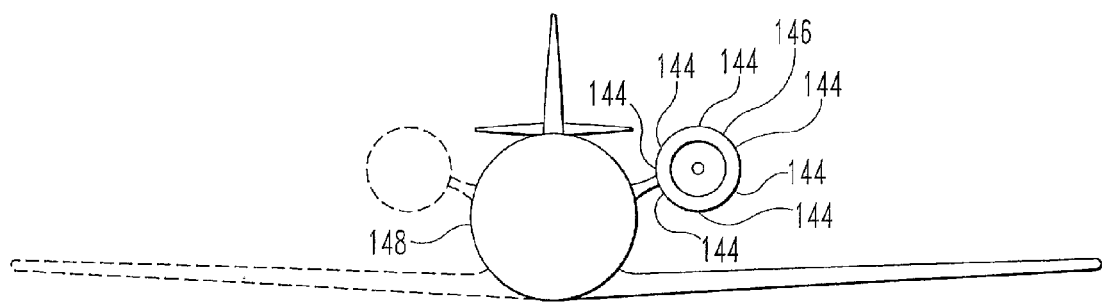
FIG. 4d is a front view of an aircraft having one embodiment of the present application.

In yet another aircraft configuration, FIG. 4c illustrates a military style aircraft 130 wherein the engines 136 are embedded within a fuselage 132. Again, similar to the previous aircraft of FIGS. 4a and 4b the fuselage 132, a nacelle 141 surrounding the engine 136 and the wings 134, can all include boundary layer bleed slots 142, 140, and 138 respectively. The slots can also be located between the inlet and the fuselage (sometimes referred to as the "arm pit") where the fuselage boundary layer can thicken.

It should be understood that the boundary layer bleed slots can be positioned anywhere on the aircraft and/or engine and are not limited by the examples disclosed in the present application. Any type of aircraft or spacecraft that can advantageously use the teachings of this disclosure is contemplated by the present invention.

In one aspect the present invention provides an apparatus comprising an aircraft having a fuselage, wings and an aircraft engine, a nacelle at least partially surrounding the aircraft engine and connected to the aircraft, an airflow passageway formed proximate the nacelle fluidically connected to a plurality of apertures formed on at least a portion of the aircraft, wherein the apertures are operable to remove boundary layer air adjacent an outer surface of the aircraft.

In one refinement the present invention further provides a heat exchanger positioned within the passageway.

In yet another refinement further provides a variable flap positioned adjacent in nozzle of the aircraft.

In still another refinement the boundary layer air is at least partially drawn into the passageway by an ejector nozzle.

In a still further refinement the boundary layer air is at least partially drawn into the passageway by RAM effect.

In another aspect the present application provides an apparatus comprising a gas turbine engine capable of producing an exhaust flow, a nozzle structured to convey the exhaust flow from the gas turbine engine, an airflow surface having a boundary layer of moving fluid when a working fluid is flowed along the airflow surface, a conduit disposed between the nozzle and the airflow surface, and a nozzle ejector operable to extract at least a portion of the boundary layer through the conduit and entrain the at least a portion of the boundary layer with the exhaust flow.

In still another aspect the present application provides an apparatus comprising a gas turbine engine having a rotatable blade operable to produce a flow stream through a flow passage, a surface along which a working fluid can pass and having an opening through which at least a portion of a boundary layer of the working fluid can be withdrawn, and an airflow member extending across the flow passage and having a conduit through which the boundary layer withdrawn from the surface can pass.

In a still further aspect the present application provides an apparatus comprising a gas turbine engine having a nozzle ejector, an exhaust flow from the gas turbine engine forming the primary fluid of the nozzle ejector, a passageway operable to convey at least a portion of a boundary layer air withdrawn from a flow stream surface upstream of the nozzle ejector, and a moveable ejector selector having an open position and a closed position, the open position forming an open position secondary airflow path from an exterior location of the nozzle ejector to the primary fluid of the nozzle ejector, the closed position forming a closed position secondary airflow path from the flow stream surface, through the passageway, and to the primary fluid of the nozzle ejector.

In yet a further aspect the present application provides a method comprising operating a gas turbine engine to produce an exhaust flow, withdrawing a boundary layer air from a working fluid flowing along an airflow surface, and entraining the boundary layer air with the exhaust flow using a nozzle ejector of the gas turbine engine.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law.

Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
    a gas turbine engine having an outer casing that enclosed by a nacelle, the gas turbine is capable of producing an exhaust flow, wherein the nacelle having opening therethrough for receiving external air;
    a nozzle structured to convey the exhaust flow from the gas turbine engine;
    an airflow surface forming by the nacelle having a boundary layer of moving fluid when the external air is flowed along the airflow surface, when at least a portion of the boundary layer is received through the nacelle opening;
    a conduit disposed between the nozzle and the airflow surface;
    a moveable nozzle ejector operable to extract at least a portion of the boundary layer through the conduit and entrain the at least a portion of the boundary layer with the exhaust flow; and
    a moveable member connected to the nacelle; and
    wherein the moveable member is moveable to a first position that provides for the passage of the at least a portion of the boundary layer, and to a second position that provides for a passage of an external air during a takeoff of the aircraft.

2. The apparatus of claim 1, which the moveable nozzle ejector further includes a moveable surface disposed proximate an opening through which the at least a portion of the boundary layer is discharged to be entrained with the exhaust flow.

3. The apparatus of claim 1, which further includes a lobed mixer, wherein the portion of the boundary layer and the exhaust flow passes through the lobed mixer.

4. The apparatus of claim 1, which further includes an aircraft having the gas turbine engine.

5. An apparatus comprising:
    a gas turbine engine having a moveable nozzle ejector and an outer casing with a nacelle, an exhaust flow from the gas turbine engine forming the primary fluid of the moveable nozzle ejector;
    a passageway between the outer casing and the nacelle operable to convey at least a portion of a boundary layer air withdrawn from an external flow stream surface upstream of the nozzle ejector;
    a heat exchanger disposed within the passageway; and
    a moveable flap having an open position and a closed position, the open position forming an open position for a secondary airflow path from a flow stream surface exterior of the moveable nozzle ejector to the passageway, the closed position forming a closed position secondary airflow path from the flow stream surface through the passageway, and to the primary fluid of the nozzle ejector.

6. The apparatus of claim 5, which further includes an aircraft and wherein the flow stream surface is at least one of the nacelle and a pylon.

7. The apparatus of claim 5, which further includes the moveable flap capable of varying an exit area of at least one of the open position for the secondary airflow path and the closed position for the secondary airflow path as the withdrawn boundary layer air is pumped by the exhaust flow.

8. An apparatus comprising:
    a gas turbine engine having an outer casing enclosed by a nacelle and is capable of producing an exhaust flow, wherein the nacelle having an opening therethrough for receiving external air;
    an airflow surface forming by the nacelle for receiving the external air from the slots and is capable of producing a boundary layer of fluid formed by passage of a freestream along the airflow surface;
    a moveable ejector having a primary fluid flow produced by the gas turbine engine; and
    means for selecting a secondary fluid flow for the ejector.

* * * * *